United States Patent
Akman et al.

(10) Patent No.: US 10,939,267 B1
(45) Date of Patent: Mar. 2, 2021

(54) APPARATUS AND METHOD FOR A UNIFIED SLICE MANAGER

(71) Applicant: NETSIA, INC., Sunnyvale, CA (US)

(72) Inventors: Arda Akman, Istanbul (TR); Burcu Yargicoglu, Istanbul (TR)

(73) Assignee: Netsia, Inc., Santa Clara, CA (US)

( * ) Notice: Subject to any disclaimer, the term of this patent is extended or adjusted under 35 U.S.C. 154(b) by 0 days.

(21) Appl. No.: 16/541,478

(22) Filed: Aug. 15, 2019

(51) Int. Cl.
| | |
|---|---|
| *H04L 12/24* | (2006.01) |
| *H04W 4/50* | (2018.01) |
| *H04W 28/08* | (2009.01) |
| *H04W 48/18* | (2009.01) |
| *H04W 84/04* | (2009.01) |

(Continued)

(52) U.S. Cl.
CPC .......... *H04W 4/50* (2018.02); *H04L 41/0843* (2013.01); *H04L 41/0893* (2013.01); *H04L 41/12* (2013.01); *H04L 41/145* (2013.01); *H04L 41/5019* (2013.01); *H04L 41/5048* (2013.01); *H04W 28/0842* (2020.05); *H04W 48/18* (2013.01); *H04W 84/04* (2013.01); *H04W 88/18* (2013.01); *H04W 92/02* (2013.01)

(58) Field of Classification Search
CPC .............................. G06F 9/455–45558; G06F 2009/45562–45595; H04L 41/02–5096; H04L 47/14; H04L 47/18; H04L 69/08; H04L 69/18–26; H04W 4/50; H04W 16/02–225; H04W 28/02–26; H04W 40/24–32; H04W 48/02–20; H04W 76/10–50; H04W 84/02; H04W 84/04–047; H04W 84/10–22; H04W 88/005–184; H04W 92/02–20
See application file for complete search history.

(56) References Cited

U.S. PATENT DOCUMENTS

| | | |
|---|---|---|
| 2017/0054595 A1 | 2/2017 | Zhang et al. |
| 2019/0174405 A1* | 6/2019 | Yang ..................... H04W 76/12 |

(Continued)

OTHER PUBLICATIONS

"3rd Generation Partnership Project; Technical Specification Group Services and System Aspects; Telecommunication management; Study on management and orchestration of network slicing for next generation network," TR 28.801, v15.1.0, Jan. 2018, 79pgs.

(Continued)

*Primary Examiner* — Timothy J Weidner
(74) *Attorney, Agent, or Firm* — Shumaker & Sieffert, P.A.

(57) ABSTRACT

Systems and methods are described to enable a so-called 'unified slice', wherein the unified slice is technology-independent, i.e., constructed from different networking technologies, and spans multiple operators. The method provides an abstraction of a network slice and its segments, and a way to coordinate the end-to-end slice information collection, slice segment configuration and activation across multiple types of networks and operators. The system of invention has the task of coordinating configuration of an end-to-end slice, with user-specified slice parameters, by communicating with the respective slice managers; It receives information to generate an abstract model of each slice segment, and sends the required slice segment attributes to these slice managers so that they can activate the segment after translating them according to capabilities of their network technology.

20 Claims, 8 Drawing Sheets

(51) Int. Cl.
*H04W 88/18* (2009.01)
*H04W 92/02* (2009.01)

(56) References Cited

U.S. PATENT DOCUMENTS

2020/0128450 A1* 4/2020 Wang ...................... H04W 8/14
2020/0228405 A1* 7/2020 Fang ................... H04L 41/0843

OTHER PUBLICATIONS

"5G; System Architecture for the 5G System," 3GPP TS23.501, v15.2.0, release 15, Jun. 2018, 219pgs.
"Universal Mobile Telecommunications System (UMTS); LTE; General Packet Radio System (GPRS) Tunnelling Protocol User Plane (GTPv1-U)," 3GPP TS29.281, v9.3.0, release 9, Jun. 2010, 26pgs.

* cited by examiner

APPARATUS AND METHOD FOR A UNIFIED SLICE MANAGER

BACKGROUND OF THE INVENTION

Field of Invention

The present invention relates to a system and method for providing a network slice across access, backhaul, fronthaul and core network components comprising 3GPP and multiple non-3GPP network technologies.

Discussion of Related Art

Any discussion of the prior art throughout the specification should in no way be considered as an admission that such prior art is widely known or forms part of common general knowledge in the field.

3GPP standards architected a sliceable 5G infrastructure to provide many logical network segments over a common single physical network (see TR 28.801). New technologies such as software defined networking (SDN) wherein control plane (CP) and user plane (UP) are separated, and network function virtualization (NFV) are the key enablers for breaking up traditional network structures. With network slicing, customizable and virtualized network components can be stitched together, using only software, to provide the right level of connectivity.

One of the primary technical challenges facing service providers today is the ability to deliver a wide array of network performance characteristics that future services will demand. To name a few, bandwidth, latency, packet loss, security, and reliability will vary greatly from one service to the other. Emerging applications such as remote operation of robots, massive TOT, and self-driving cars require connectivity, but with vastly different characteristics. The combination of architecture flexibility, software programmability, and needs of different business segments (medical, factories, military, public safety, etc.) and applications have led to the creation of the concept of network slicing. A network slice provides a way to completely segment the network to support a particular type of service or business or even to host service providers (multi-tenancy) who do not own a physical network. Furthermore, each slice can be optimized according to capacity, coverage, connectivity, security and performance characteristics. Since the slices can be isolated from each other, as if they are physically separated both in the control and user planes, the user experience of the network slice will be the same as if it was a separate network. A network slice can span all domains of the network including software applications (both memory and processing) running on network nodes, specific configurations of the core transport network, access network configurations as well as the end devices.

Slicing as applied to Radio Access Network (RAN) has been widely presented in prior art where it mainly aims at enabling spectrum sharing among operators. The goal is optimizing the overall radio resource utilization and offer different uplink and downlink bandwidths. Targeting the same goal of efficient sharing of network infrastructure among operators, the slicing concept is also used for multi-tenant SDN controllers in prior art. 3GPP defined 5G as mainly comprised of the 'access network' and the 'core network'. The core network relies on SDN UP and CP and NFV, wherein all control and user plane network functions are virtualized and completely distributed. Prior art 4G gateway components such as Serving GW (S-GW), PDN GW (P-GW) and Mobility Management Entity (MME) are all decomposed into virtual network functions (VNFs), with UP and CP subcomponents, which are distributed across the core network. Transport network functions such as switching and routing are also modelled as VNFs or Physical Network Functions (PNFs). Decomposition has also happened at the access network by denser deployment of small cells or Remote Radio Heads (RRH). These small units are deployed anywhere with potentially high traffic requirements to satisfy the need. A Base-Band Unit (BBU) is deployed to manage a group of RRHs, each RRH connecting to a BBU forming the so-called 'fronthaul'. The access network is formed by the BBUs (or base stations) attaching to the core network infrastructure through a 'backhaul' network. SDN concepts apply to access, fronthaul, backhaul and core network components. Meaning, they all have individual control planes to provide configurability, provisioning and network management.

Non-3GPP access, fronthaul and backhaul comprise technologies such as Digital Subscriber Loop (DSL), cable, fiber, and Wi-Fi, to name a few. Slicing these technology segments along with the 5G network segments has not been yet addressed. However, a coordinated end-to-end slicing of the future networks will inevitably include 3GPP as well as non-3GPP components. For example, the core network can be a 3GPP operator's 5G core network extended using an Internet Service Provider's (ISP)'s backbone network; The access network can be more economically configured as Wi-Fi as opposed to cellular, depending on location; DSL may be more ubiquitous at one specific site than radio, etc. Of course, the delivery methods of a slice that correspond the same or similar level quality of service (QoS) are different across these technology segments. While 3GPP access must account for the high mobility of users, and thus frequently adjusting slice parameters across many base stations, the non-3GPP access such as fiber-optic may be preferred when there is need for high capacity for non-mobile devices such as IOT.

3GPP standardization efforts have gone into defining specific slices and their requirements based on application/service type. For example, the user equipment (UE) can now directly specify its desired slice using a new field in the packet header called Network Slice Selection Assistance ID (NSSAI). A subfield of NSSAI is Slice/Service Types (SST) that is used to indicate the slice type. The standards already defined most commonly usable network slices and reserved the corresponding standardized SST values (see ETSI TS 23.501). For example, SST values of 1, 2 and 3 correspond to slice types of enhanced Mobile Broadband (eMBB), ultra-reliable and low-latency communications (uRLLC) and massive IoT (MIoT), respectively. These services reflect the most commonly planned new services. The network slice selection instance for a UE is normally triggered as part of the UE's initial registration procedure. The Access and Mobility Management Function (AMF) of the core network retrieves the slices that are allowed by the user's subscription and interacts with the Network Slice Selection Function (NSSF) of the core network to select the appropriate network slice instance for that traffic on the RAN. Furthermore, a service provider can offer the Network Slice as a Service (NSaaS) to another service provider in the form of a virtual telecommunications service. NSaaS allows the tenant provider to use the network slice instance just like an end user, or optionally allows the tenant provider to manage the specific network slice instance via a network management exposure interface. In turn, the tenant provider may use the slice by further slicing it to offer its own communication services family. A public safety network provider, for example, can be a tenant of a mobile operator's network and request a slice that has high security and high reliability.

3GPP specified Network Slice Management Function (NSMF) as a new virtual network management function that belongs to OSS/BSS layer whose sole role is to deliver an appropriate slice to the user/application after authenticating it. So, NSMF is purely a slice-dedicated function with slice-specific view on any data and management procedures in the 3GPP network. The physical implementation of multiple network slices onto a specific network function, whether it is VNF or PNF, is done by its Element Management System (EMS). The NSMF instructs that network function's element management system (EMS) and/or Network Management System (NMS) to configure the physical network component to deliver the required slice characteristics. 3GPP specified Network Slice Subnet Management Function (NSSMF) as another new function that embraces all these EMS/NMS functions for configuring specific group (or subnet) of VNFs and PNFs. Note that network transport components such as switches and routers are also modelled as PNFs or VNFs without loss of generality.

From here on, when NSMF and NSSMF functions do not need to be mentioned separately, the term Slice Management Function (SMF) is used in short to mean NSMF and/or NSSMF. SMF term is also used in 3GPP 5G standards documents.

Most non-3GPP networks nowadays provide SDN-like control capabilities by using control plane and data plane separation. For example, in a Passive Optical Networks (PON), a controller is implemented that can assign Optical Network Units (ONUs) to users, each ONU to an Optical Line Termination Equipment (OLT), and furthermore, allocate buffer resources of OLT and ONUs to properly serve different traffic types. Similarly, other non-3GPP technologies such as switched Wide Area Networks (WANs), WiFi access networks support SDN's separated control and user planes. The control plane functions along with EMS/NMS functions are used to slice these network technologies.

According to an aspect of this invention a new network function is defined to coordinate and orchestrate across slice management functions of 3GPP and non-3GPP networks, multiple 3GPP and/or non-3GPP operators the resource-configuration and resource-activation of a network slice in such a way that the same level of QoS, security, reliability and bandwidth are provided end-to-end. In an embodiment, the unified Network Slice Management Function (uSMF) (or in short Unified Slice Manager (uSM)), the system of invention, enables the stitching of segments of a slice from non-3GPP and 3GPP networks and possibly across multiple operators in a coordinated manner using only their respective SMFs, and without directly interfacing and configuring any network element. This is achieved by employing a two-tier slice management infrastructure. At the top tier slice management, aka uSMF, a new Information Model (IM) comprised of meta-data (a representation of slice and slice segment resources, 3GPP and non-3GPP alike) is employed, which is then communicated with the second tier slice management, aka SMFs, controlling the actual slice resources and mapping into physical network resources. In turn, each SMF may implement the slice resource allocation and activation using their respective NSMF and NSSMF functions.

In patent application WO 2017/032280 A1 a system called Slice Creation and Management Entity (SCME) is described that can receive a user's slice request and transmit instructions directly to network components to allocate and configure slice segment resources to construct a slice. The embodiments here are substantially different than that of WO 2017/032280 A1 since the system of this invention uses a two-tier slice management approach, i.e., communicates with multiple slice management systems (such as the SCME) to coordinate the end to end delivery of a slice across different access network technologies and different operators without any direct touch-points onto network components and resources.

In one embodiment, a new Information Model is described within the uSM to adequately represent a slice in the form of meta-data: Slice Information Base (SIB), Slice Segment Information Base (SSIB), Slice Template Information Base (STIB), User Information Base (UIB), Channel Information Base (CIB) and Topology Information Base (TIB). Technology-specific physical implementation of the data stored in the Information Base is performed by the underlying SMFs, and therefore not detailed here.

Each Slice in SIB is obtained by combining at least two Slice Segments from SSIB wherein a Slice Segment is a constituent segment of a network that can be 3GPP, non-3GPP, access, fronthaul, backhaul or core, and belong to the same or different network providers.

Slice→{Slice Segment 1, Slice Segment 2, Slice Segment 3, etc.}

Both Slice and Slice Segment are 'meta concepts' wherein their actual physical implementation of each Segment is the task of the SMF corresponding to the Slice Segment's network provider's physical network.

Both Slice and Slice Segment have many attributes at least including its performance characteristics (latency, security, reliability, etc.), operational status (active, in provisioning, inactive etc.), and business attributes (such as provider, price, duration etc.).

The STIB includes typical slice profiles with certain predefined set of characteristics. For example, STIB may have a Slice Template of a secure and highly reliable slice, or a low latency and low packet loss slice. While some templates may be customized, others may match exactly with Slice Service Types (SST) defined by 3GPP. A slice or slice segment object inherits attributes from one of the readily defined templates in STIB.

The UIB contains information associated with users that can request a slice from the system of invention. The CIB contains information associated with the two-tier management infrastructure such as the connections (or communication channels) of the system of invention (first tier) to the downstream SMFs (second tier), and the TIB contains information associated with the topology of 3GPP network (key NFV and PNF locations, their Identifiers (IDs) such as location, IP address, MAC address, Port number, etc.).

The TIB also contains information about the 3GPP and non-3GPP interworking topology including 3GPP core network gateways at different locations that allow non-3GPP access networks to attach the 3GPP core network. One example of interworking is specified in TS 23.501 V15.2.0 (section 4.2.8), wherein a Non-3GPP Interworking Function (N3IWF) (so called a gateway here) provides the interfacing between 3GPP control plane (CP) and user plane (UP) functions and the non-3GPP access networks. The gateways that support the N3IWF functions allow the user equipment of a non-3GPP network to appear as if a 3GPP user equipment to network functions such as AMF and UPF. Since these gateway functions are specified in the standards documents, they will not be further detailed here.

One or more of the following characteristics is specified in a Slice Template:

1. Technology Type (radio, cable, DSL, Wi-Fi, fiber)
2. SST
3. Bandwidth (upstream and downstream)
4. End-to-end packet latency
5. Reliability/Availability
6. Packet loss
7. Security (encryption)
8. Charging type
9. Traffic priority
10. Service Function Chain (SFC) on data path
11. Traffic policies (such as security or routing policies)

Embodiments of the present invention are an improvement over prior art systems and methods.

SUMMARY OF THE INVENTION

In one embodiment, the present invention provides a method as implemented in a unified Slice Management Function (uSMF) to configure and activate a network slice, the method comprising the steps of: (a) receiving a network slice request associated with a user with one or more specific service requirements; (b) determining: (1) at least a first slice segment and a second slice segment needed to construct a network slice to meet the one or more specific service requirements in (a), the first slice segment being on a first network and the second slice segment being on a second network, the first network and second network comprising different networks, and (2) a slice ID; (c) sending a first message to a first Slice Management Function (SMF) of the first network to allocate the first slice segment; (d) receiving a first response from first SMF, the first response acknowledging receipt of the first message and identifying a first slice segment identifier; (e) sending a second message to a second SMF of the second network, the second message including instructions to: (1) allocate the second slice segment, and (2) use the first slice segment identifier of (d) to attach to the first slice segment; (f) receiving a second response from the second SMF acknowledging receipt of the second message; (g) sending a message to the first and second SMFs to activate the first and second slice segments, respectively; and wherein the first and second slice segments are activated by the first and second SMFs based on configuring network components corresponding to the first and second slice segments, respectively.

In another embodiment, the present invention provides a system to configure and activate a network slice, the network slice associated with one or more service requirements, the network slice comprising a plurality of slice segments, each of the plurality of slice segments associated with a different network, each of the plurality of slice segments configured by a corresponding Slice Management Function (SMF), the system comprising: (a) a first sub-function to determine which slice segments among the plurality of slice segments to use to meet the one or more service requirements associated with the network slice; (b) a second sub-function to activate slice segments identified by the first sub-function by sending messages to corresponding SMF; (c) an information model and an associated database that stores: (1) slice and slice segment information; (2) slice and slice segment templates, (3) interworking network topologies, (4) user information, (5) SMF interface information; and (d) a plurality of physical network interfaces to at least two SMFs, each SMF configuring a different network slice segment.

In yet another embodiment, the present invention provides an article of manufacture comprising non-transitory computer storage medium storing computer readable program code which, when executed by a processor in a single node, implements a method as implemented in a unified Slice Management Function (uSMF) to configure and activate a network slice, the non-transitory computer storage medium comprising: (a) computer readable program code receiving a network slice request associated with a user with one or more specific service requirements; (b) computer readable program code determining: (1) at least a first slice segment and a second slice segment needed to construct a network slice to meet the one or more specific service requirements in (a), the first slice segment being on a first network and the second slice segment being on a second network, the first network and second network comprising different networks, and (2) a slice ID; (c) computer readable program code sending a first message to a first Slice Management Function (SMF) of the first network to allocate the first slice segment; (d) computer readable program code receiving a first response from first SMF, the first response acknowledging receipt of the first message and identifying a first slice segment identifier; (e) computer readable program code sending a second message to a second SMF of the second network, the second message including instructions to: (1) allocate the second slice segment, and (2) use the first slice segment identifier of (d) to attach to the first slice segment; (f) computer readable program code receiving a second response from the second SMF acknowledging receipt of the second message; (g) computer readable program code sending a message to the first and second SMFs to activate the first and second slice segments, respectively; and wherein the first and second slice segments are activated by the first and second SMFs based on configuring network components corresponding to the first and second slice segments, respectively.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, router, switch, gateway, SMF, uSMF, controller, etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The to coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a base station, switch, router, controller, optical line termination, gateway or host is a piece of networking component, including hardware and software that communicatively interconnects with other equipment of the network (e.g., other network devices, and end systems). Switches provide network connectivity to other networking equipment such as switches, gateways, and routers that exhibit multiple layer networking functions (e.g., routing, layer-3 switching, bridging, VLAN (virtual LAN) switching, layer-2 switching, Quality of Service, and/or subscriber management), and/or provide support for traffic coming from multiple application services (e.g., data, voice, and video). User Equipment (UE) is generally a user device such as a cellular phone, or a sensor, or a computer or another type of equipment that wirelessly and with-wire connects to a network.

Any physical device in the network has a type, location, ID/name, Medium Access Control (MAC) address, and Internet Protocol (IP) address. Furthermore, a physical device can host a collection of VNFs or PNFs, each identified by a virtual port number and/or virtual IP address. The uSMF, SMF, SDN controller, OSS/BSS or any VNF/PNF can be on a single computer or distributed across multiple computers identified by at least an IP address, MAC address and one or more Port numbers.

Note that while the illustrated examples in the specification discuss mainly 5G networks relying on SDN (as Internet Engineering Task Force [IETF] and Open Networking Forum [ONF] defined), and NFV (as European Telecommunications Standards Institute (ETSI) defined), embodiments of the invention may also be applicable in other kinds of network (mobile and non-mobile) that are sliceable. 3GPP's 5th generation mobile network (5G) standards provide the software architecture, interfaces and protocols for a mobile operator to create a network slice with specific resources. However, creating a network slice by (a) combining different types of access slice segments using non-3GPP technologies such as Wi-Fi, fiber, cable and DSL, along with 3GPP technologies, (b) combining slice segments from 3GPP core network along with ISP networks, and (c) combining slice segments from different 3GPP operators are yet to be addressed.

Figure 1:
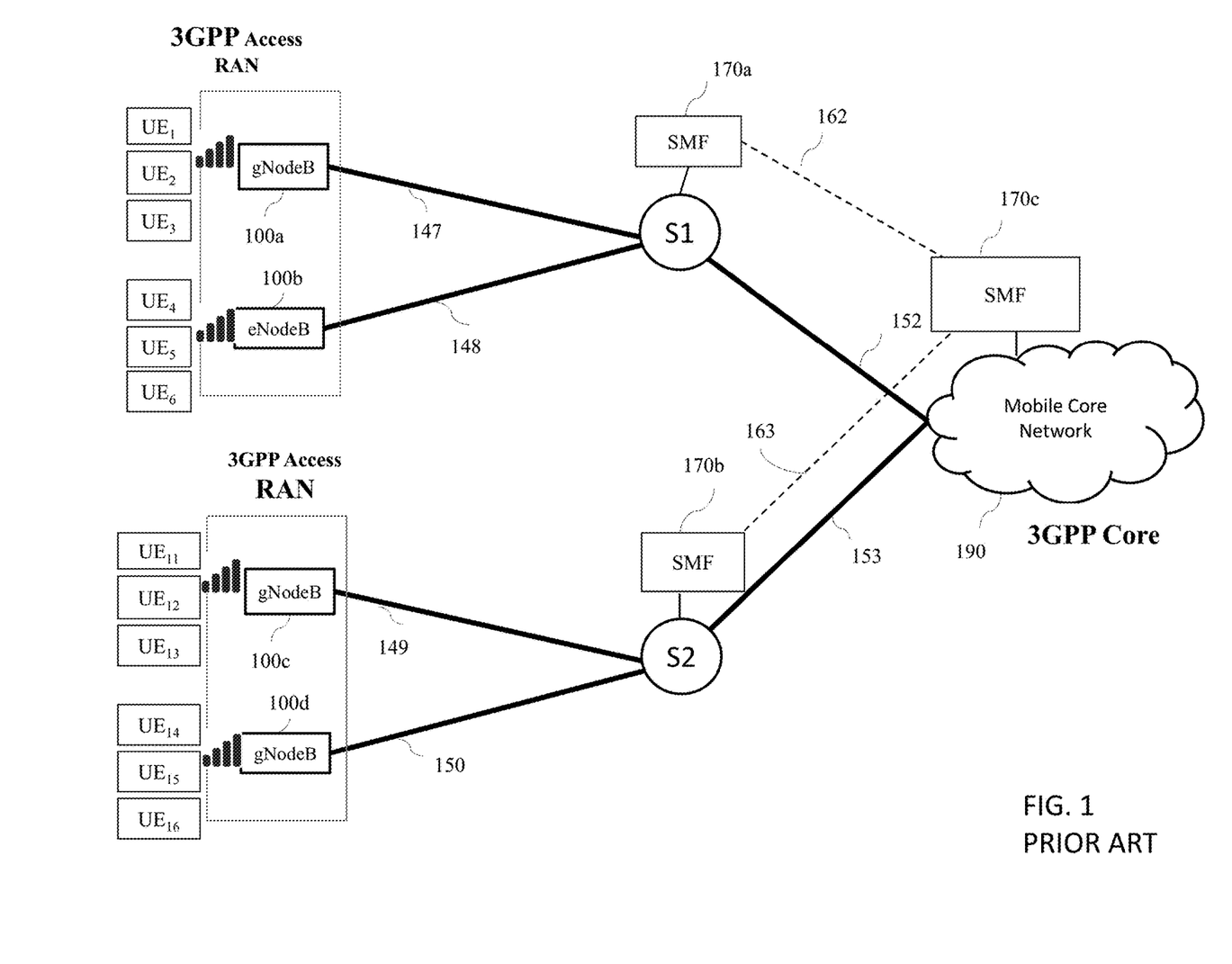
FIG. 1 illustrates an exemplary 5G access and core network in prior art.

FIG. 1 is a simple 3GPP network comprising UE 1, 2 and 3 that are attached to base station (gNodeB) 100a, and UE 4, 5 and 6 that are attached to base station (eNodeB) 100b, forming a simple Radio Access Network location. A similar RAN location is also shown with UE 11, 12, 13 attached to base station 100c and UE 14, 15, 16 attached to base station 100d. Base stations 100a and 100b are attached to aggregation switch S1 with connections 147 and 148, respectively, while base stations 100c and 100d are attached to aggregation switch S2 with connections 149 and 150, respectively. Both switches S1 and S2 are attached to the core network 190 providing the connectivity between RAN and the core network. Also shown in the diagram are exemplary Slice Management Functions (SMF)s 170a, 170b and 170c, wherein SMF 170a is servicing the first RAN, SMF 170b is servicing the second RAN, and SMF 170c is servicing the core network. These SMFs may function as an NSMF and/or an NSSMF. The SMFs on a 3GPP network must act in a coordinated way to configure a slice, which may have several RAN and core network segments. For example, a simple slice between UE 1 and 11 comprises (a) a 'first slice segment' on first RAN, (b) a 'second slice segment' on core network, and (c) a 'third slice segment' on second RAN. Therefore, SMFs 170a, 170c and 170b must engage in corresponding slice segment configuration and activation. The connections 162 and 163 represent virtual channels for inter-SMF messaging and coordination, and ride on physical links 152 and 153.

Figure 2:
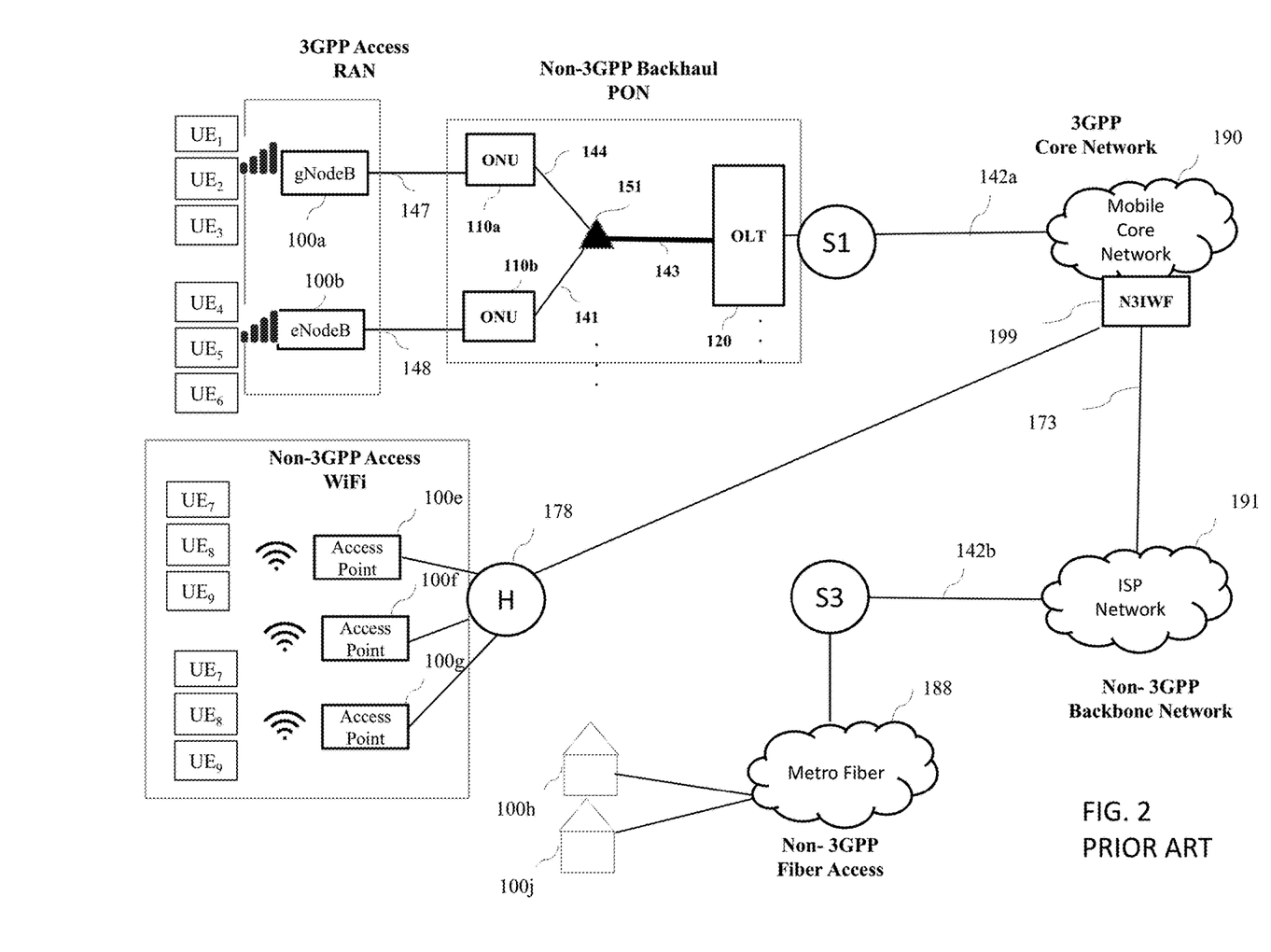
FIG. 2 illustrates an exemplary 5G network with 3GPP and non-3GPP segments in prior art.

FIG. 2 shows a network with 3GPP and non-3GPP access network segments. The 3GPP RAN (first RAN of FIG. 1) is attached to aggregation switch S1, with a non-3GPP passive optical network (PON) backhaul. Each base station is connected to an Optical Network Unit (ONU), which in turn connects to an Optical Line Termination (OLT). The fiber connection between ONUs 110a and 110b, and OLT 120 has an Optical Distribution Network (ODN), which splits fiber optic channel 143, into 141 and 144 using splitter 151.

Core network 190 includes gateway 199, which is the N3IWF including the necessary UP and CP functions required for slice-interworking. Although this example groups all the interworking functions into a single gateway, there may be other embodiments wherein these functions are implemented in different ways such as accessing directly to PGW for trusted access or via ePDG for untrusted access. In this simple network, each non-3GPP slice attaches to core network 190 via gateway 199.

The non-3GPP access is provided in two other access nodes: The Wi-Fi access node comprises Access Points 100e, 100f, and 100g attached to Hub 178, and the simple fiber access node uses fiber-at-home 100h and 100j, attached to metro fiber access network 188. Non-3GPP fiber access network attaches to ISP network 191 via aggregation switch S3, which in turn attaches to core network 190's gateway 199 via connection 173. Non-3GPP Wi-Fi network attaches to mobile core 190 via gateway 199.

A simple slice between UE 1 and 9 comprises (a) a 'first slice segment' on first RAN, (b) a 'second slice segment' on ONU 110a and OLT 120, (c) a 'third slice segment' on core network 190 (including switches S1 and S3), (d) a 'fourth slice segment' on ISP's network 191, and (e) a 'fifth slice segment on Wi-Fi access node 100f, and switch/hub 178.

Therefore, the following slice segments must be configured:

| Slice Segment | Technology | Type | Component |
|---|---|---|---|
| First slice segment | 3GPP | cellular | access |
| Second slice segment | Non-3GPP | PON | backhaul |
| Third slice segment | 3GPP | Wireline | core |
| Fourth slice segment | Non-3GPP | Wireline | backbone |
| Fifth slice segment | Non-3GPP | Wi-Fi | access |

The configuration of such as complex slice structure with several different slice segments across different parts of the network, using different technologies and possibly across multiple operators is highly challenging. Using the embodiments of this invention configuring and activating a slice in such complex slice structures becomes feasible.

One of the key challenges in stitching slice segments is identifying the traffic that belongs to a slice so that it can be placed on the correct next slice segment. In 3GPP networks, user traffic is placed in unidirectional GTP-U tunnels between any pair of network functions. The protocol stack, header format and messages are all well known in prior art (see ETSI's 3GPP TS 29.281), and therefore not detailed here. Furthermore, the network functions of 5G core networks are detailed in various ETSI documents, and therefore will not be recited here.

GTP-U tunneling is a simple and robust solution to handle the highly mobile user equipment that has a changing location due to mobility. Instead of constantly changing routing tables in routers of the core network for the changing locations of those IP addresses of users, each UE's traffic type is wrapped into IP packets as PDU, and then wrapped into a GTP-U tunnel whose source and destination IP addresses are those network functions (e.g., base station as one anchor and UPF as the other anchor) at the two end points of the tunnel. This achieves more stable routing tables while the device moves around in the core network. The control plane of core network assigns each unidirectional GTP-U tunnel a unique Tunnel End ID (TEID). For example, if UE 1 has two traffic types with NSSAI=1 and NSSAI=2, and UE 2 has two traffic types with NSSAI=1 and NSSAI=2, and UE 3 has two traffic types with NSSAI=2, and NSSAI=3, all together they result in six tunnels, each with a different TEID. Note that NSSAI is a 3GPP-defined descriptor well known in prior art that defines up to eight different service types. When NSSAI with a specific value is present in the data packets of a UE, it defines a specific type of service that requires a unique quality of service (QoS) treatment. For example, NSSAI has a field known as Standard Slice Type (SST) having values of SST=1 for enhanced Mobile Broadband, eMB, SST=2 for ultra-reliable and ultra-low delay communications, uRLLC and SST=3 for Massive IOT, mIOT.

The TEID properly identifies both the UE and its SST/slice type between any pair of network functions within the 3GPP network. Once the user's traffic across the 3GPP network is tunneled, it becomes identifiable. The user traffic (control or user plane) on any pair of network functions (VNF or PNF) is identified with a unique TEID. Furthermore, the virtual network functions such as a user plane function (UPF) and control plane function Access Management Function (AMF) that terminates different types of 3GPP slice segments can be assigned different virtual port numbers. Thus, when the IP address and port number of the tunnel-terminating network function and the TEID are known, the connecting non-3GPP access network segments can identify specific slice segment's user traffic. A network function such as the UPF/AMF becomes the 'anchor' for connection between the 3GPP and non-3GPP access networks in this case. However, for properly interworking between the non-3GPP network and 3GPP core network the gateway functionality may be required before the traffic directly enters into UPF (or AMF) securely. Such interworking gateways may be deployed at many different locations within the 3GPP core network (see gateway 199 in FIG. 2) that is simply tasked to intercept the non-3GPP traffic first, before it enters a UPF or AMF to secure it. In such a scenario, the anchor will be the gateway, and not the UPF (or AMF). There may be several gateways strategically located within the core network. The anchor point is named as 'segment identifier' in this invention as a general term for simplicity and generality. The 'segment identifier' is an attribute (or group of attributes) of a slice segment object specifying the anchor point of that slice segment into the 3GPP slice segment. Furthermore, TIB contains all segment identifiers.

Figure 3:
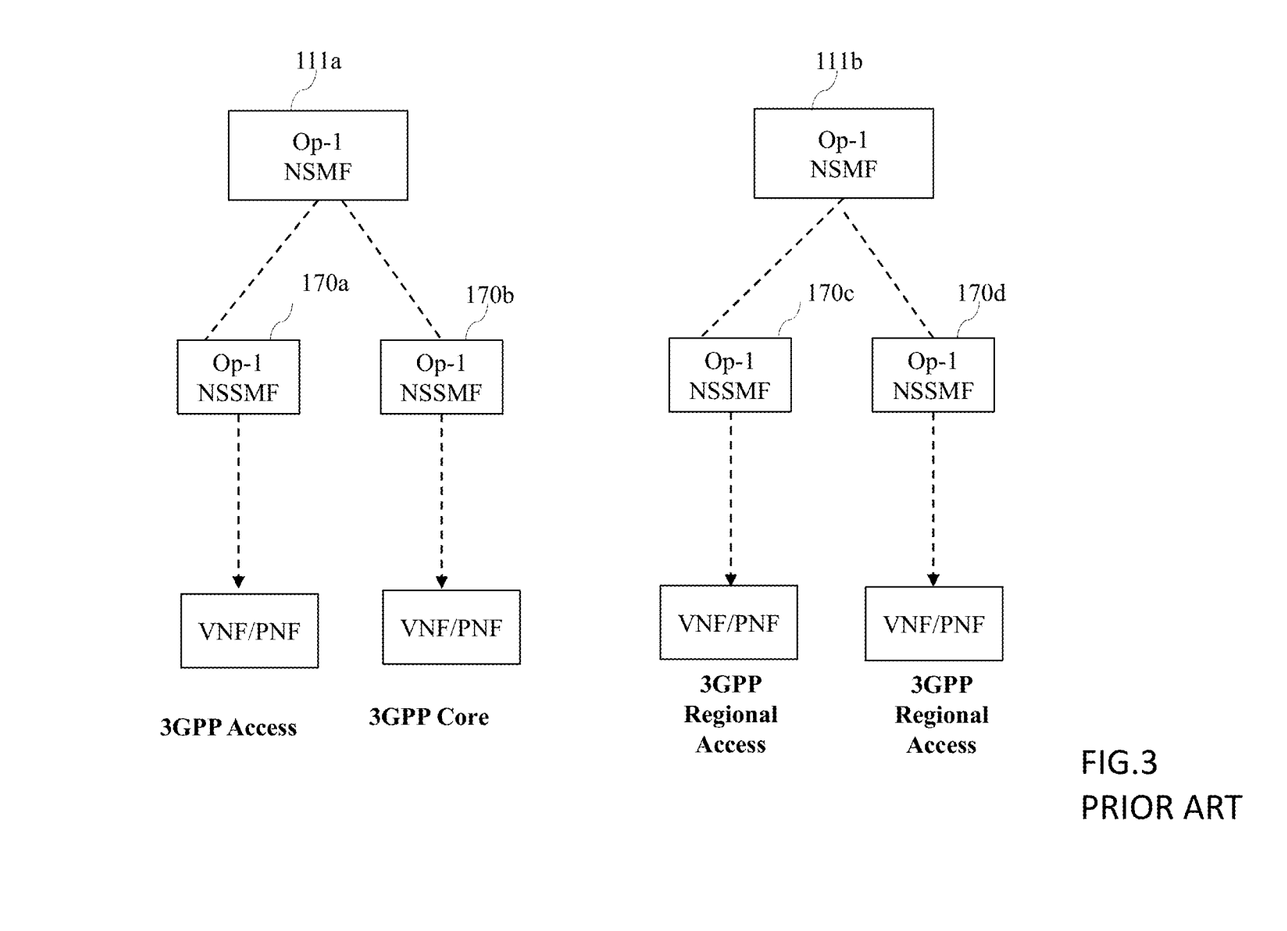
FIG. 3 illustrates the NSMF function and its interworking in prior art.

Network Slice Management is defined in 3GPP standards document TR 28.801, and comprises two layers as illustrated in FIG. 3. The top layer function is Network Slice Management Function (NSMF) that configures the slice, and the second layer is the Network Slice Segment Function (NSSMF) that directly configures individual 3GPP slice segments upon instructions from the NSMF. The figure illustrates that there may be multiple NSSMFs per 3GPP operator. Each NSSMF maps the slice-related requests into a physical network component configuration. For that reason, it is sometimes used synonymous with Element Management System (EMS) or Network Management System (NMS).

Figure 4A:
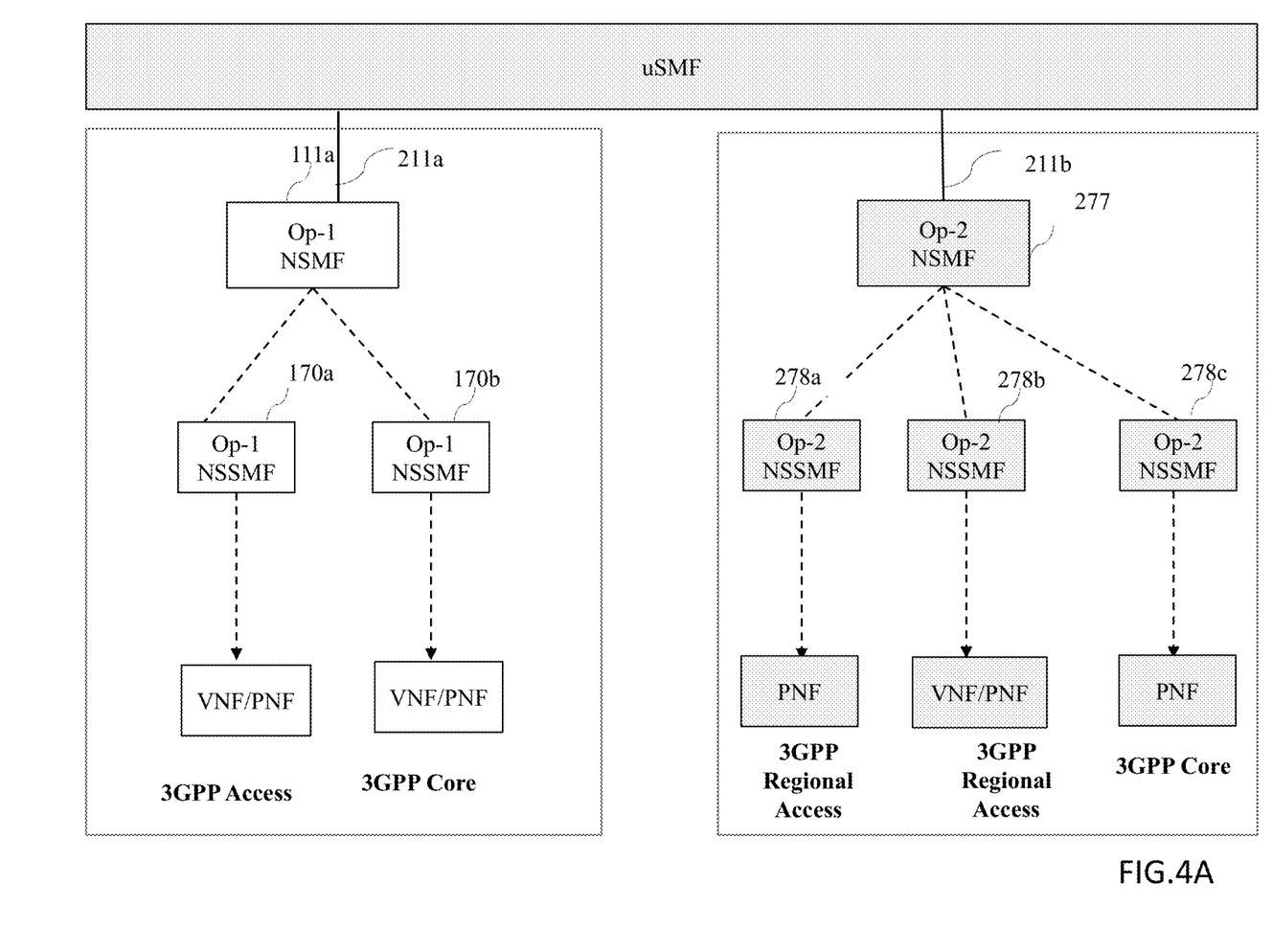
FIG. 4A illustrates the two-tier slice management infrastructure with uSMF function and its interworking for 3GPP networks according to the present invention.
Figure 4B:
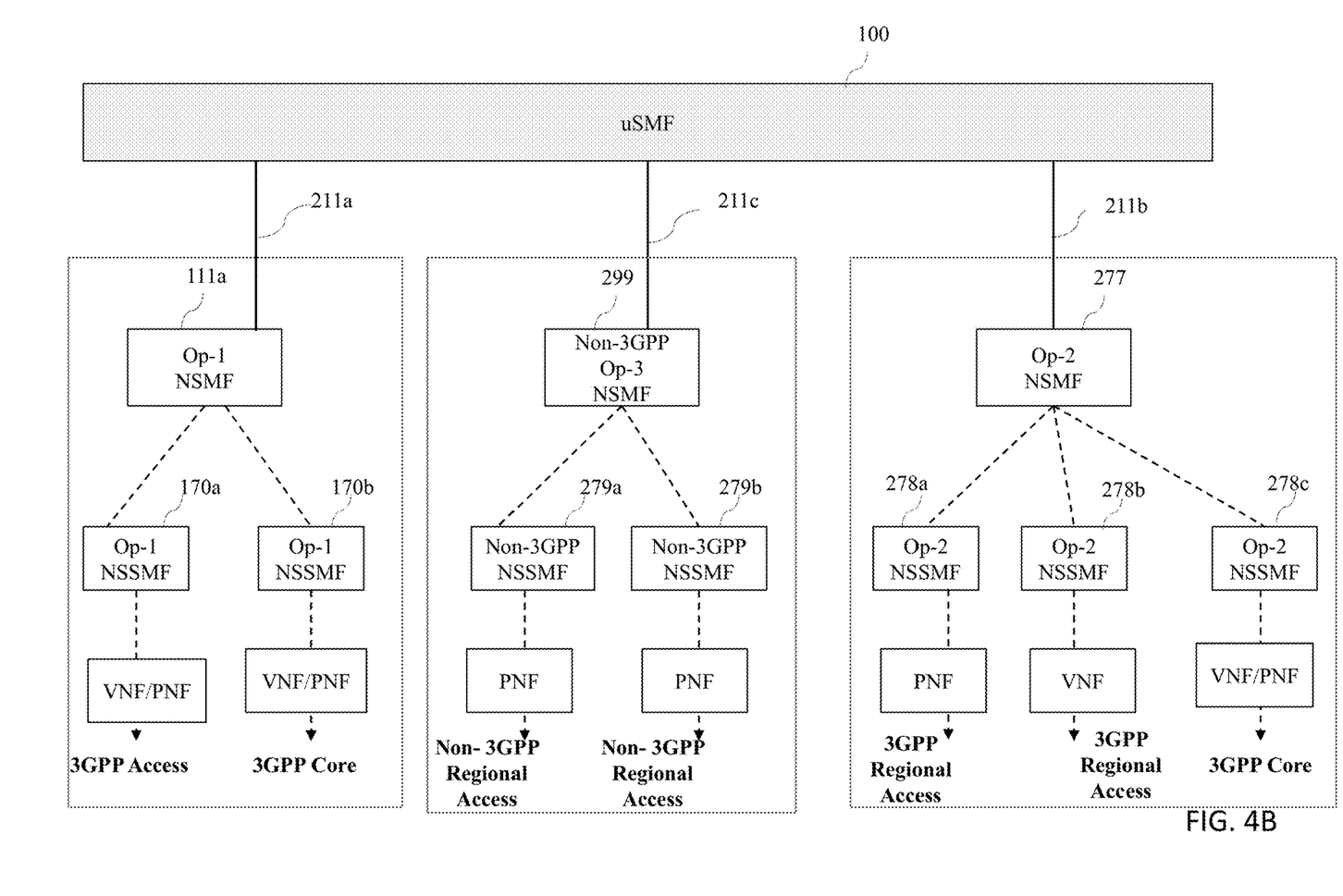
FIG. 4B illustrates the two-tier slice management with uSMF function and its interworking for 3GPP and non-3GPP networks according to the present invention.

According to an aspect of this invention, the unified Slice Management Function (uSMF) (or uSM in short) coordinates the configuration and activation of a slice across multiple network providers (operator, in short), and multiple types of access technologies. As illustrated in FIG. 4A, Operator-1's NSMF 111a and Operator-2's NSMF 277, attach to uSMF with control connections 211a and 211b, respectively. uSMF forms the top tier, NSMF becomes the second tier while NSSMF forms the third tier. NS SMF has the physical touch points into the network components. The uSMF makes requests of slice segments from the operators. NSMF conceals the slice management infrastructure of it's network, only exposing necessary information to uSMF to function properly. FIG. 4B shows a more complex scenario with 3GPP Operators-1 and 2, and non-3GPP operator 3. The uSMF attaches to NSMF 111a, non-3GPP NSMF 299, and NSMF 277 with control connections 211a, 211b and 211c, respectively.

Figure 5:
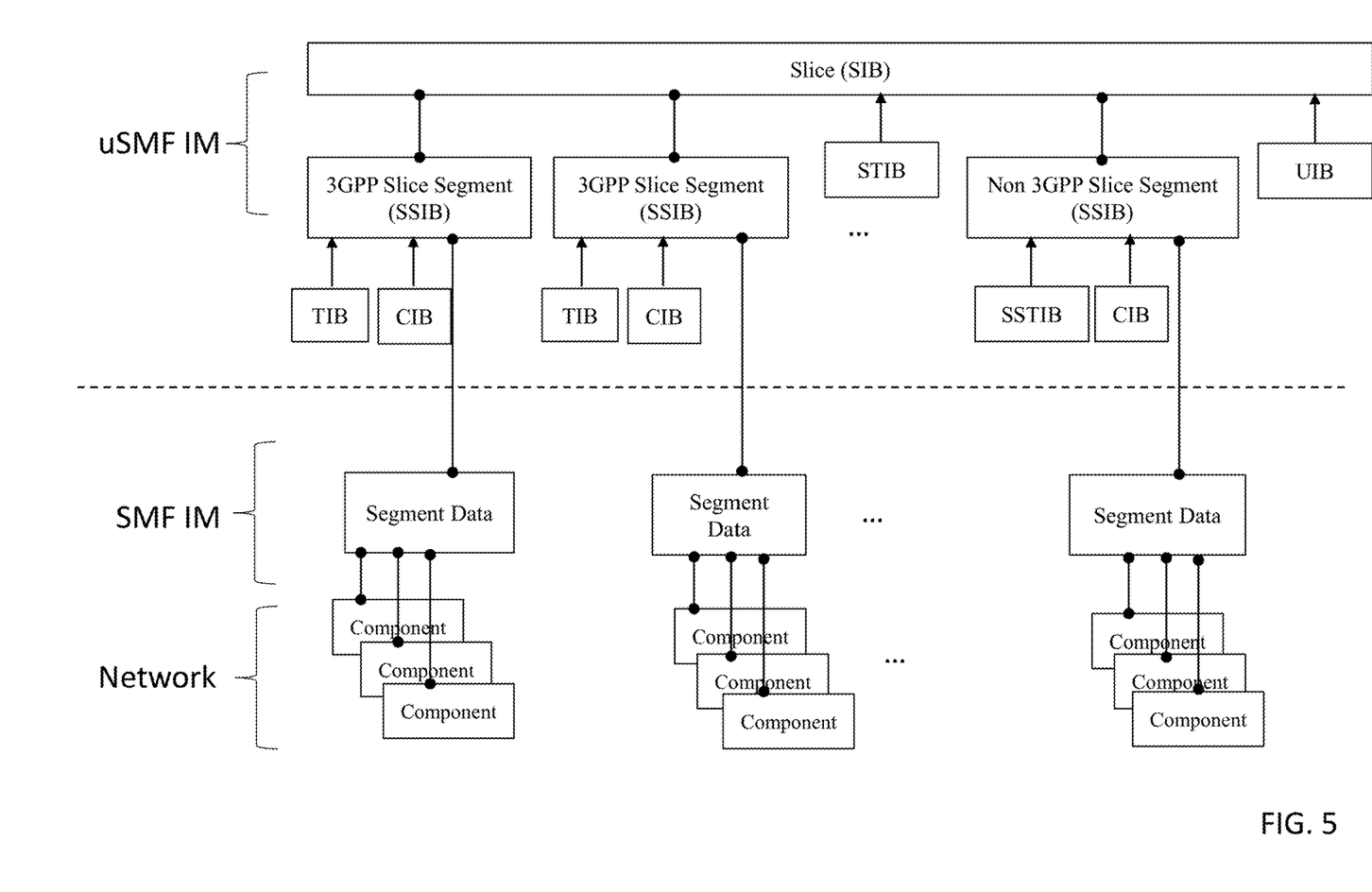
FIG. 5 illustrates a simplified Information Base for uSMF and SMF.

FIG. 5 illustrates an exemplary Information Model for an embodiment of the invention. Other information models that group information in other ways are also possible and assumed to be covered by this invention. The uSMF has data representing the slices in Slice Information Base (SIB) and slice segments in Slice Segment Information Base (SSIB). A slice object has many attributes including slice owner, end points, slice duration, operation status, slice type, bandwidth, price etc. The slice object may inherit from a standard slice template that is stored in Slice Template Information Base (STIB). If the slice QoS is different than the QoS defined by these templates, however, the elements descriptive of the QoS may be included directly within the slice object as attributes. The slice object also inherits from the User Information Base (UM) to specify the requesting user or user equipment. The slice object is associated with 3GPP and non-3GPP slice segment objects, each of which is part of SSIB. The slice segment object optionally inherits a slice segment template from Slice Segment Template Information Base SSTIB, particularly if it the segment has an attribute different than that of the slice (such as the segment packet delay). Any information that is in the STIB that applies to both slice and its slice segments (such as packet loss, security and reliability) is not repeated in SSTIB. The 3GPP slice segment object may also inherit topological attributes such as the segment identifier from the Topology Information Base TIB. This information is used for the non-3GPP slice segment to associate the user traffic with 3GPP slice segment. The slice segment also inherits from the Channel Information Base (CM) that specifies the SMF that is responsible for the slice segment. Each SMF may or may not rely on an Information Model, depending on the specific implementation. However, it must be able to receive control messages from the uSMF and implement proper control actions onto network components.

Figure 6:
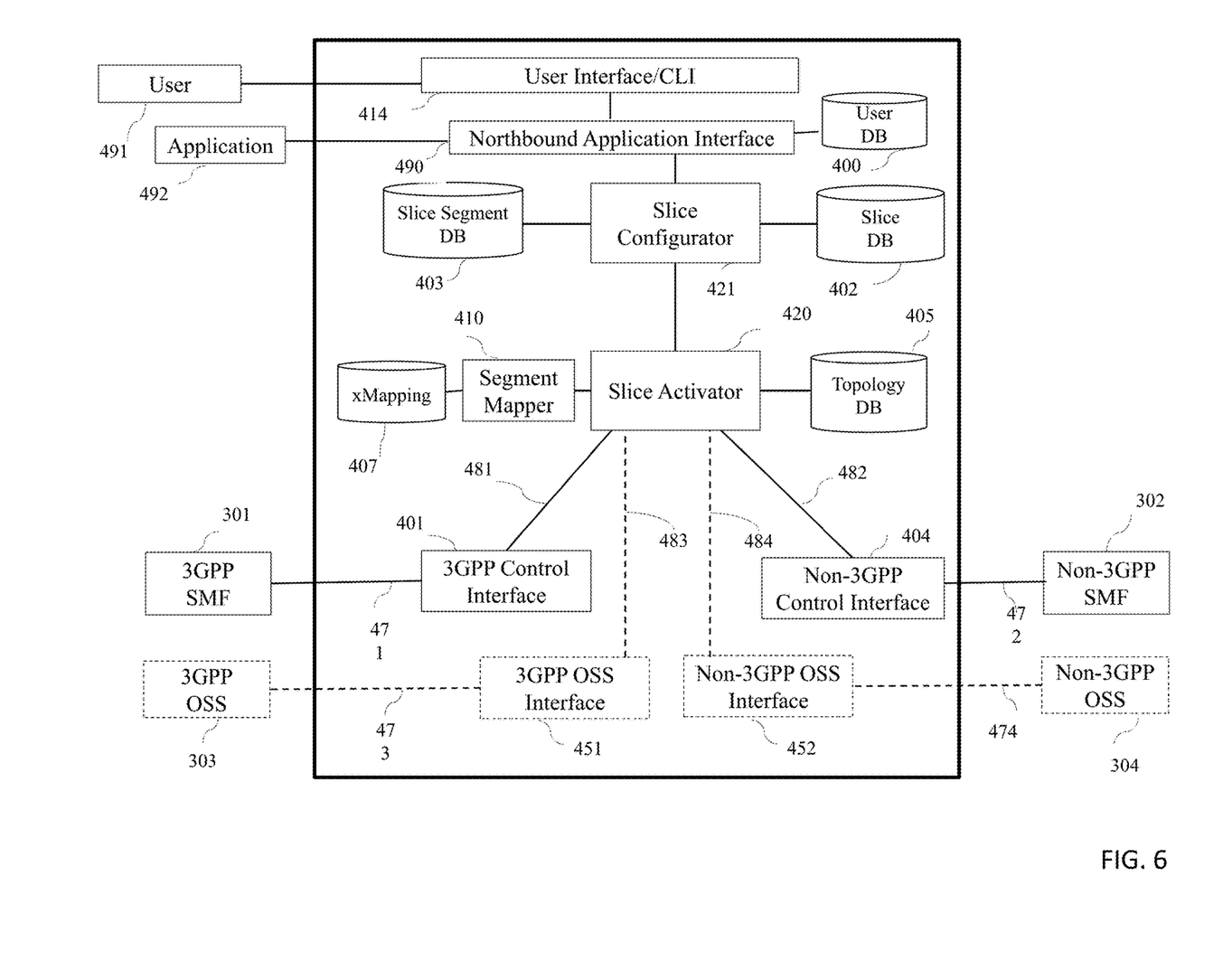
FIG. 6 illustrates the system block diagram of uSMF.

A high-level block diagram of uSMF is illustrated in FIG. 6. The slice request may come through different interfaces. These interfaces include (i) Northbound Application Interface 490 made available for 3rd Party or Operator applications to use, and (ii) Command Line Interface (CLI) and/or User Interface 414. The user related data is stored in User DB 400 while the slice request is stored in Slice DB 402, which also stores the SIB and STIB. Slice Configurator 421 is a key sub-function that realizes the user's slice request by choosing feasible slice segments using SSIB and SSTIB stored in DB 403. These slice segments may be 3GPP and non-3GPP slices from the same or different operators. Once Slice Configurator 421 determines the slice configuration, Slice Activator 420, which is another key sub-function, determines the slice allocation order and activates it by sequentially coordinating the messaging between uSMF and each SMF associated with the constituent slice segment until slice activation is completed. Before activation, Segment Mapper 410 extracts information from Topology Information Base (TIB) 405 to determine the proper segment identifier for mapping traffic between the 3GPP slice segment(s) and non-3GPP slice segments. The TIB may be populated from information stored in OSS/BSS 303 of 3GPP network and OSS/BSS 305 of non-3GPP network. Through the information stored in TIB, the physical connection between different network segments becomes well-defined. The mapping information for each slice is stored in)(Mapping DB 407.

Shown in the diagram are various interfaces of uSMF. 3GPP control interface 401 enables communications with 3GPP SMFs, and non-3GPP control interface 404 enables communications with non-3GPP SMFs, using their supported protocols or APIs for slice activation, and slice segment related data gathering. 3GPP OSS interface 451 enables communications with 3GPP OSSs, and non-3GPP OSS interface 452 enables communications with non-3GPP OSSs, using their supported protocols or APIs for topological data gathering.

Figure 7:
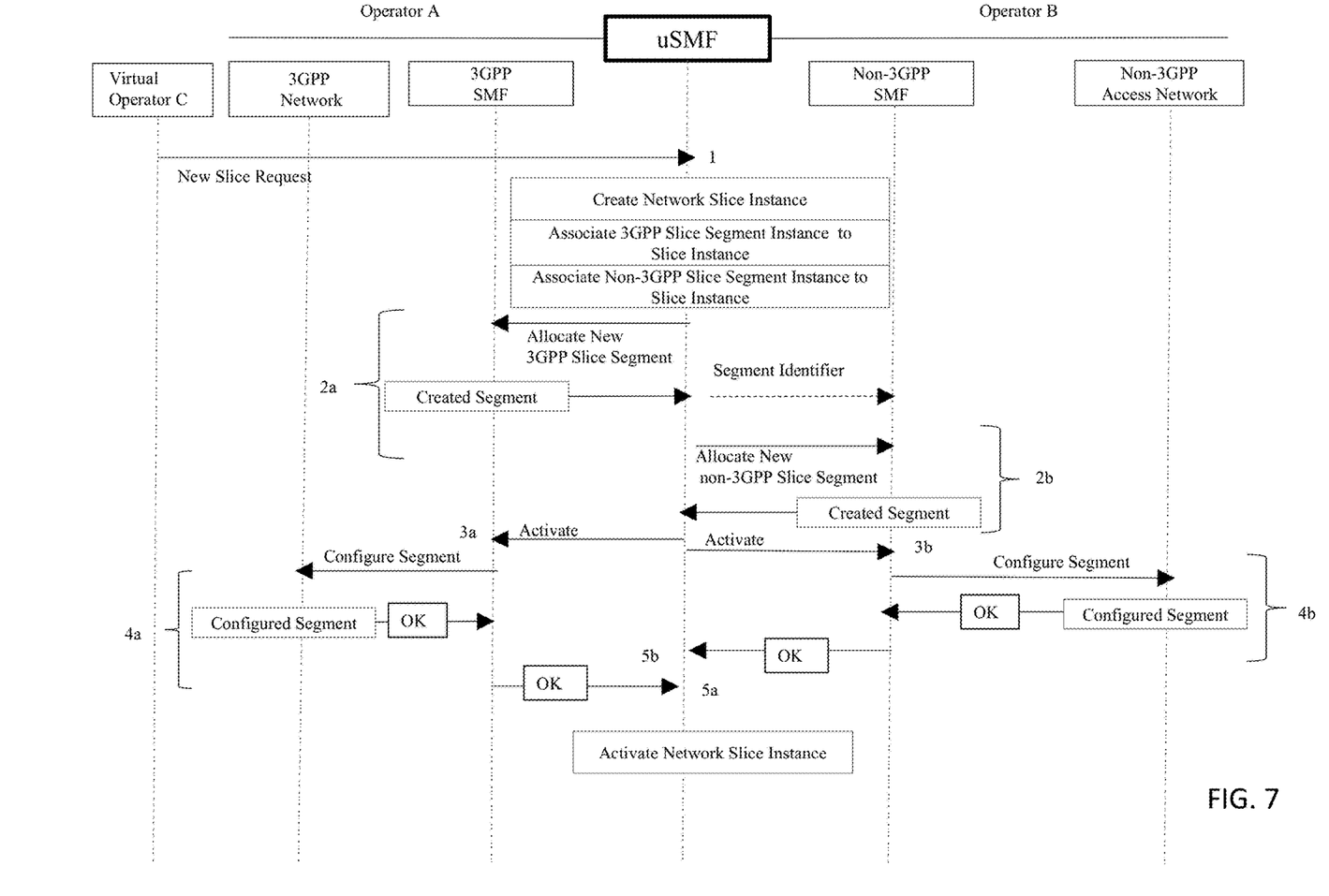
FIG. 7 depicts a simple messaging diagram for setting up a slice with 3GPP and non-3GPP access components.

FIG. 7 shows a simple messaging sequence according to a method of the invention across multiple operators. Operator C is the 'User' that generates the slice request. Operator A owns a 3GPP network. Operator B owns a non-3GPP access network. uSMF may be owned by Operator A or B or C or yet another service provider. The requested slice has two segments: first segment across 3GPP operator's access and core network, and second segment across non-3GPP operator's access network. The segment identifier (or gateway) between these two segments can be a UPF/AMF or an interworking gateway function within the 3GPP operator's core network with a specific location, IP address, MAC address, and/or port number. This is the information stored in)(Mapping DB of FIG. 6. uSMF receives the slice request in step 1. It generates the slice object and determines the constituent first and second slice segments. In step 2a, uSMF requests the allocation first slice segment from the SMF of 3GPP network of Operator A. SMF returns the segment identifier. In step 2b, the uSMF requests the allocation of second slice segment from the SMF of non-3GPP network of Operator B using the received segment identifier. When both steps 2a and 2b are successfully completed, the uSMF triggers the activation of the slice in steps 3a and 3b. Accordingly, each SMF triggers physical configuration of constituent network components in steps 4a and 4b. Once this step is successfully completed, the slice is deemed activated. Note that the uSMF merely coordinated the activation of slice without connecting to any network component. The specific sequence of operations is described merely as an example. Many different sequences are possible and assumed covered by this invention.

In another embodiment of uSMF, it may include the function of 3GPP SMF or a sub-component of SMF such as NSMF or NSSMF. Such different but trivial configurations of the uSMF are included in this invention.

In one embodiment, the present invention provides a method as implemented in a unified Slice Management Function (uSMF) to configure and activate a network slice, the method comprising the steps of: (a) receiving a network slice request associated with a user with one or more specific service requirements; (b) determining: (1) at least a first slice segment and a second slice segment needed to construct a network slice to meet the one or more specific service requirements in (a), the first slice segment being on a first network and the second slice segment being on a second network, the first network and second network comprising different networks, and (2) a slice ID; (c) sending a first message to a first Slice Management Function (SMF) of the first network to allocate the first slice segment; (d) receiving a first response from first SMF, the first response acknowledging receipt of the first message and identifying a first slice segment identifier; (e) sending a second message to a second SMF of the second network, the second message including instructions to: (1) allocate the second slice segment, and (2) use the first slice segment identifier of (d) to attach to the first slice segment; (f) receiving a second response from the second SMF acknowledging receipt of the second message; (g) sending a message to the first and second SMFs to activate the first and second slice segments, respectively; and wherein the first and second slice segments are activated by the first and second SMFs based on configuring network components corresponding to the first and second slice segments, respectively.

In another embodiment, the present invention provides a system to configure and activate a network slice, the network slice associated with one or more service requirements, the network slice comprising a plurality of slice segments, each of the plurality of slice segments associated with a different network, each of the plurality of slice segments configured by a corresponding Slice Management Function (SMF), the system comprising: (a) a first sub-function to determine which slice segments among the plurality of slice segments to use to meet the one or more service requirements associated with the network slice; (b) a second sub-function to activate slice segments identified by the first sub-function by sending messages to corresponding SMF; (c) an information model and an associated database that stores: (1) slice and slice segment information; (2) slice and slice segment templates, (3) interworking network topologies, (4) user information, (5) SMF interface information; and (d) a plurality of physical network interfaces to at least two SMFs, each SMF configuring a different network slice segment.

In yet another embodiment, the present invention provides an article of manufacture comprising non-transitory computer storage medium storing computer readable program code which, when executed by a processor in a single node, implements a method as implemented in a unified Slice Management Function (uSMF) to configure and activate a network slice, the non-transitory computer storage medium comprising: (a) computer readable program code receiving a network slice request associated with a user with one or more specific service requirements; (b) computer readable program code determining: (1) at least a first slice segment and a second slice segment needed to construct a network slice to meet the one or more specific service requirements in (a), the first slice segment being on a first network and the second slice segment being on a second network, the first network and second network comprising different networks, and (2) a slice ID; (c) computer readable program code sending a first message to a first Slice Management Function (SMF) of the first network to allocate the first slice segment; (d) computer readable program code receiving a first response from first SMF, the first response acknowledging receipt of the first message and identifying a first slice segment identifier; (e) computer readable program code sending a second message to a second SMF of the second network, the second message including instructions to: (1) allocate the second slice segment, and (2) use the first slice segment identifier of (d) to attach to the first slice segment; (f) computer readable program code receiving a second response from the second SMF acknowledging receipt of the second message; (g) computer readable program code sending a message to the first and second SMFs to activate the first and second slice segments, respectively; and wherein the first and second slice segments are activated by the first and second SW's based on configuring network components corresponding to the first and second slice segments, respectively.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of an apparatus and method for a unified slice manager. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method as implemented in a unified Slice Management Function (uSMF) to configure and activate a network slice, the method comprising the steps of:
    (a) receiving a network slice request associated with a user with one or more specific service requirements;
    (b) determining: (1) at least a first slice segment and a second slice segment needed to construct a network slice to meet the one or more specific service requirements in (a), the first slice segment being on a first network and the second slice segment being on a second network, the first network and second network comprising different networks, and (2) a slice ID;
    (c) sending a first message to a first Slice Management Function (SMF) of the first network to allocate the first slice segment;
    (d) receiving a first response from the first SMF, the first response acknowledging receipt of the first message and identifying a first slice segment identifier;
    (e) sending a second message to a second SMF of the second network, the second message including instructions to: (1) allocate the second slice segment, and (2) use the first slice segment identifier of (d) to attach to the first slice segment;
    (f) receiving a second response from the second SMF acknowledging receipt of the second message;
    (g) sending a message to the first and second SMFs to activate the first and second slice segments, respectively; and
    wherein the first and second slice segments are activated by the first and second SMFs based on configuring network components corresponding to the first and second slice segments, respectively.

2. The method of claim 1, wherein the first network is a 3GPP network, and the second network is a non-3GPP network.

3. The method of claim 2, wherein the non-3GPP network is picked from any of the following: WiFi, WiMax, microwave, fiber, cable and DSL technologies.

4. The method of claim 2, wherein the 3GPP network comprises access, transport and core sub-networks.

5. The method of claim 1, wherein each of the first and second slice segments are associated with a first 3GPP network and a second 3GPP network, respectively, the first and second 3GPP networks associated with different operators.

6. The method of claim 5, wherein each of the first and second 3GPP networks comprises access, transport and core sub-networks.

7. The method of claim 1, wherein each of the first and second slice segments are associated with a first non-3GPP network and a second non-3GPP network, the first and second non-3GPP networks associated with either a same operator or different operators.

8. The method of claim 7, wherein each of the first and second non-3GPP network are picked from any of the following: WiFi, WiMax, microwave, fiber, cable and DSL technologies.

9. The method of claim 1, wherein the network components are either virtual network functions (VNFs) or physical network functions (PNFs), wherein the VNFs or PNFs are configurable by their respective SMFs.

10. The method of claim 1, wherein the method comprises returning the slice ID in (b) to the user to manage the network slice from a single management point.

11. The method of claim 1, wherein the uSMF derives interworking requirements based on: (1) the specific service requirements, (2) a type of the first network, (3) a type of the second network, wherein the derived internetworking requirements are translated into the first slice segment identifier.

12. The method of claim 11, wherein the uSMF determines the first and second slice segments forming the networking slice, their allocation order and message contents of messages sent to respective SMFs to construct the network slice to meet the interworking requirements.

13. The method of claim 1, wherein the network slice request is sent from any of the following: a software application accessing the uSMF via a northbound application interface, a command line slice request input via a command line interface, or a user interface.

14. A system to configure and activate a network slice, the network slice associated with one or more service requirements, the network slice comprising a plurality of slice segments, each of the plurality of slice segments associated with a different network, each of the plurality of slice segments configured by a corresponding Slice Management Function (SMF), the system comprising:

(a) a first sub-function to determine which slice segments among the plurality of slice segments to use to meet the one or more service requirements associated with the network slice;

(b) a second sub-function to activate slice segments identified by the first sub-function by sending messages to corresponding SMFs;

(c) an information model and an associated database that stores: (1) slice and slice segment information; (2) slice and slice segment templates, (3) interworking network topologies, (4) user information, (5) SMF interface information; and     (d) a plurality of physical network interfaces to at least two of the SMFs, each SMF configuring a different network slice segment.

15. The system of claim 14, wherein the system further comprises a northbound application interface.

16. An article of manufacture comprising non-transitory computer storage medium storing computer readable program code which, when executed by a processor in a single node, implements a method as implemented in a unified Slice Management Function (uSMF) to configure and activate a network slice, the non-transitory computer storage medium comprising:

(a) computer readable program code receiving a network slice request associated with a user with one or more specific service requirements;

(b) computer readable program code determining: (1) at least a first slice segment and a second slice segment needed to construct a network slice to meet the one or more specific service requirements in (a), the first slice segment being on a first network and the second slice segment being on a second network, the first network and second network comprising different networks, and (2) a slice ID;

(c) computer readable program code sending a first message to a first Slice Management Function (SMF) of the first network to allocate the first slice segment;

(d) computer readable program code receiving a first response from the first SMF, the first response acknowledging receipt of the first message and identifying a first slice segment identifier;

(e) computer readable program code sending a second message to a second SMF of the second network, the second message including instructions to:

(1) allocate the second slice segment, and (2) use the first slice segment identifier of (d) to attach to the first slice segment;

computer readable program code receiving a second response from the second SMF acknowledging receipt of the second message;

(g) computer readable program code sending a message to the first and second SMFs to activate the first and second slice segments, respectively; and     wherein the first and second slice segments are activated by the first and second SMFs based on configuring network components corresponding to the first and second slice segments, respectively.

17. The article of manufacture of claim 16, wherein the network components are either virtual network functions (VNFs) or physical network functions (PNFs), wherein the VNFs or PNFs are configurable by their respective SMF s.

18. The article of manufacture of claim 16, wherein the non-transitory computer storage medium further comprises computer readable program code returning the slice ID in (b) to the user to manage the network slice from a single management point.

19. The article of manufacture of claim 16, wherein the non-transitory computer storage medium further comprises computer readable program code deriving interworking requirements based on: (1) the specific service requirements, (2) a type of the first network, (3) a type of the second network, wherein the derived internetworking requirements are translated into the first slice segment identifier.

20. The article of manufacture of claim 19, wherein the non-transitory computer storage medium further comprises computer readable program code determining the first and second slice segments forming the networking slice, their allocation order and message contents of messages sent to respective SMFs to construct the network slice to meet the interworking requirements.

\* \* \* \* \*